United States Patent [19]

Urano et al.

[11] 4,209,247
[45] Jun. 24, 1980

[54] ENVIRONMENTALLY PROTECTED CAMERA WITH AN INTERCHANGEABLE DRAWING TYPE FINDER

[75] Inventors: Fumio Urano, Omiya; Akihiro Arai, Urawa; Takumi Kobayashi, Tokyo; Eiji Yamamori, Tokyo; Norimichi Takahashi, Tokyo; Junji Umetsu, Kita, all of Japan

[73] Assignee: Asahi Kogaku Kogyo Kabushiki Kaisha, Tokyo, Japan

[21] Appl. No.: 970,094

[22] Filed: Dec. 15, 1978

[30] Foreign Application Priority Data

Dec. 20, 1977 [JP] Japan .................................. 52-154134

[51] Int. Cl.$^2$ .............................................. G03B 13/02
[52] U.S. Cl. .................................................. 354/219
[58] Field of Search ........................ 355/30, 53, 54, 57, 355/288, 64, 219, 222, 224, 225, 151–155; 312/341 NR; 220/82 A, 345, 351

[56] References Cited

U.S. PATENT DOCUMENTS

| 2,478,470 | 8/1949 | Eastman et al. | 220/345 |
| 2,653,852 | 9/1953 | Bissman | 312/341 NR UX |
| 2,815,252 | 12/1957 | Baker | 312/341 NR UX |
| 2,883,919 | 4/1959 | Jayet | 354/64 |
| 3,174,417 | 3/1965 | Sauer et al. | 354/155 |
| 3,218,946 | 11/1965 | Lange | 354/54 |
| 3,439,831 | 4/1969 | Pullen | 220/345 |

Primary Examiner—Donald A. Griffin
Attorney, Agent, or Firm—Sughrue, Rothwell, Mion, Zinn and Macpeak

[57] ABSTRACT

A camera having an interchangeable finder with rails or rail grooves that is detachably mounted on a camera body by being moved back and forth. The camera body has rail grooves (or rails) engaging the interchangeable finder. A viscoelastic member and a resin member or a metal member are secured in combination to the interchangeable finder of the drawing type or the camera body. When the interchangeable finder of drawing type is mounted on the body, the resin member or the metal member abuts against the camera body or the interchangeable finder of drawing type to thereby establish an environmental seal.

11 Claims, 5 Drawing Figures

F I G. 3
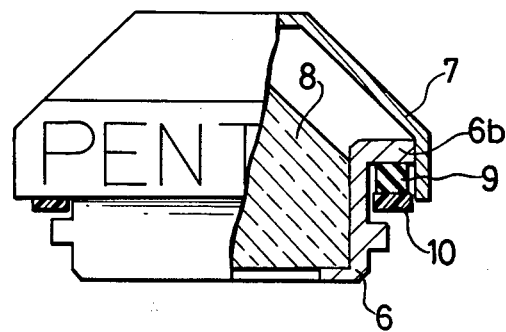
F I G. 4
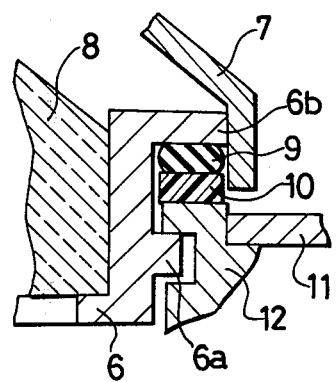

4,209,247

ENVIRONMENTALLY PROTECTED CAMERA WITH AN INTERCHANGEABLE DRAWING TYPE FINDER

BACKGROUND OF THE INVENTION

This invention relates to the environmental protection for a camera. The use of a conventional camera in rain, dust, water splashing or the like is not preferable. This may spoil the film or may break down the camera. Thus, the operation of the conventional camera is limited to a certain extent. Conventional interchangeable view finders for cameras can be roughly divided into an interchangeable view finder of pull-up type as shown in FIG. 1 and an interchangeable view finder of drawing type as shown in FIG. 2.

FIG. 1 shows the interchangeable view finder of pull-up type. This interchangeable finder can be installed on the camera body by depressing it downward in one direction of the arrow and by pulling it upward in the opposite direction of the arrow. The pull-up type interchangeable finder 1 can be mounted on the camera body by depressing the interchangeable finder 1 until it engages the locking member (not shown) of the camera body 2. In some of the cameras of this type, a rubber cover 3 as shown in FIG. 1, abuts against the camera body 2 by the utilization of the elasticity or bending characteristic of the rubber cover 3. This cover is secured to the pull-up type interchangeable finder 1 to prevent the entry of dust through the gap between the pull-up type interchangeable finder and the camera body. However, this method is insufficient when the camera is used under adverse weather conditions such as in rain or in marine use where water splashing is common.

FIG. 2 shows the interchangeable view finder of drawing type. In this finder interchanging system, the rails (or protruded parts) of the drawing type interchangeable finder are engaged with rail grooves 5 secured to the camera body 2. That is, the interchangeable finder 4 can be installed on the camera body 2 by pushing the interchangeable finder 4 in one direction of the arrow and removed therefrom by pushing the interchangeable finder 4 in the opposite direction of the arrow. In the camera of this type, the interchangeable finder 4 slides on the camera body when the interchangeable finder 4 is mounted on the camera body or removed therefrom. Accordingly, it is not preferable to interpose a viscoelastic member such as rubber high in coefficient of friction between the interchangeable finder 4 and the camera body because the viscoelastic member will obviously make it difficult to remove the finder. Thus, in such systems sealant has not been provided between the interchangeable finder 4 and the camera body.

SUMMARY OF THE INVENTION

Accordingly, it is an object of this invention to provide for an interchangeable finder that seals the camera body against damaging materials.

Yet another object of this invention is to provide for an interchangeable new finder of the drawing type in a camera that will provide for all-weather operation.

A further object of this invention is to provide for an interchangeable viewfinder of the drawing type that prevents dust and moisture from entering the body yet does not effect overall operation of the camera.

These and other objects of this invention are accomplished by means of a seal placed between the rail or rail groove and the body of the finder body. The seal comprises a viscoelastic member and a low friction member coupled to the viscoelastic member. The seal may be adhered to either the finder body or to the camera body.

As indicated, this invention relates to a camera provided with an interchangeable finder of drawing type as shown in FIG. 2. According to the invention, a moisture-proof and dust-proof camera with an interchangeable finder of drawing type is provided which is an all-weather camera in which the above-described limitations in photographing condition have been eliminated without lowering the functions and operability of the camera. Furthermore, with the camera according to the invention, the operating sound is reduced.

This invention will be described with reference to its preferred embodiment and the accompanying drawings.

BRIEF DESCRIPTION OF THE DRAWINGS

FIG. 3 is a side view, with parts cut away, showing a drawing type interchangeable finder according to this invention;

FIG. 4 is a sectional view showing the essential parts of a basic example of the drawing type interchangeable finder according to the invention.

DESCRIPTION OF THE PREFERRED EMBODIMENT

Figure 1:
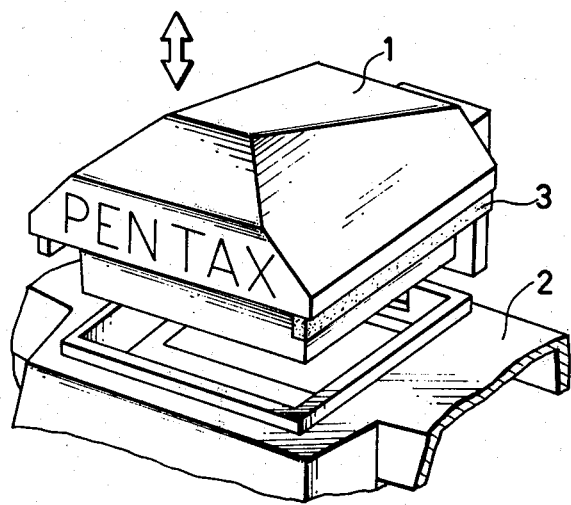
FIG. 1 is a perspective view showing a pull-up type interchangeable finder.

Referring now to FIG. 3 a side view, with parts cut away, illustrates an interchangeable finder of drawing type according to the invention. This interchangeable finder of drawing type essentially comprises a finder body 6, a finder cover 7, and a prism 8, which are assembled into one unit with screws (not shown). A viscoelastic member 9 in the form of a strip is bonded to the finder body 6, and a plate-shaped plastic cover 10 is secured to the viscoelastic member 9 in such a manner that the plastic cover 10 can be moved vertically in FIG. 3 owing to the viscoelasticity of the viscoelastic member 9. That is, the member 9 may be compressed against the flange-like portion 6b.

Figure 2:
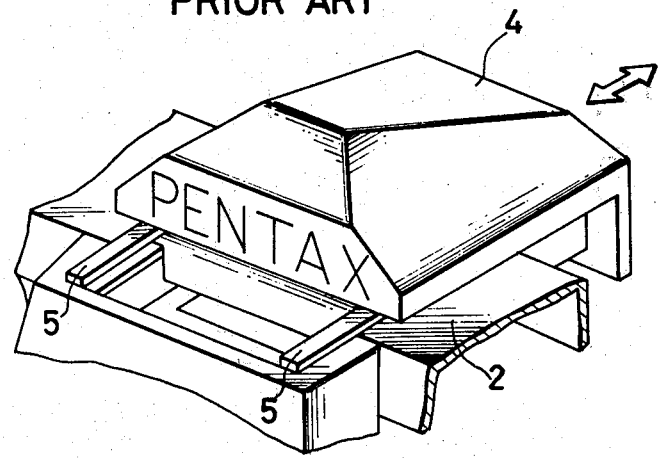
FIG. 2 is a perspective view showing a drawing type interchangeable finder.

FIG. 4 is a sectional view showing the essential parts of a camera body and the drawing type interchangeable finder shown in FIG. 3 installed thereon. As shown in FIG. 2 and also in FIG. 4 the interchangeable finder is installed on the camera body (not shown) by engagement of a rail 6a (or a protruded part) of the finder body 6 with a rail groove 12 fixed to the camera body. This engagement is against the viscoelastic force of the viscoelastic member 9 described with reference to FIG. 3 and therefore, as shown in FIG. 4 compression occurs.

In this case, since the upper surface of the rail groove 12 is depressed by the plastic cover 10 owing to the viscoelastic force of the viscoelastic member 9, no moisture or dust is allowed to enter the camera body. The plastic cover 10 abuts against the said groove 12 as the finder slides into position. Since the plastic cover 10 is low in coefficient of friction, the interchangeable finder can be readily installed on the camera body and removed from the camera body. In FIG. 4, reference numeral 11 designates a decoration board which is secured to the camera body (not shown) with screws.

Figure 5:
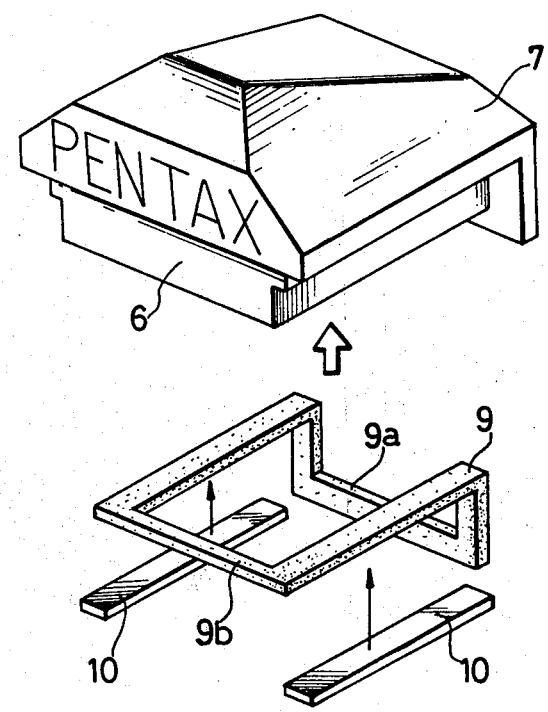
FIG. 5 is an exploded perspective view showing the essential parts of a second example of the drawing type interchangeable finder according to the invention.

FIG. 5 is an exploded perspective view showing the essential parts of a second example of the drawing type interchangeable finder according to the invention. In this embodiment, a viscoelastic member 9 is in the form of a closed loop comprising parts 9a and 9b. The viscoelastic member 9 is bonded to a finder body 6. Similarly as in FIGS. 3 and 4, plastic covers 10 are secured to the viscoelastic member 9 so that, when the interchangeable finder is installed on the camera body, the plastic covers 10 are interposed the viscoelastic member 9 and the upper surfaces, of sliding surfaces, of rail grooves formed in the camera body. When the drawing type interchangeable finder is installed on the camera body, the plastic covers 10 directly abut against the camera body acting against the viscoelastic force of the parts 9a and 9b of the viscoelastic member 9 so that a moisture-proof and dust-proof seal is established between the interchangeable finder and the camera body.

The same effect can be obtained even if the plastic covers 10 are replaced by metal covers and even if the plastic covers 10 and the viscoelastic member 9 are provided on the camera body instead of the finder. It is apparent that other modifications of this invention can be made without departing from the essential scope thereof. If for example, the seal is placed on the camera body it could be placed on the top surface of the rail groove 12 in the cover 10 positioned on top of member 9 to maintain proper sliding contact of the low friction member.

We claim:

1. In a camera of the interchangeable view finder type with rails or rail grooves and having a view finder body slidably detachably mounted on a camera body having compatible rails or rail grooves, the improvement comprising a composite seal element interposed between the rail and rail groove combination and the finder body, said composite seal element comprising a relatively high friction viscoelastic member means which is in compression for forming an environmental seal when said interchangeable view finder is mounted on said camera body, and low friction strip member means for permitting low friction sliding movement between said view finder body and said rail and groove combination.

2. The camera of claim 1 wherein said low friction member is secured to said viscoelastic member.

3. The camera of claims 1 or 2 wherein said viscoelastic member is secured to said view finder body.

4. The camera of claim 3 wherein said viscoelastic member is disposed about outside edges of said finder body in a closed loop.

5. The camera of claim 4 wherein said low friction member comprises two parallel strips disposed on said viscoelastic member in alignment with said rails.

6. The camera of claim 5 wherein said low friction member comprises two metal strips.

7. The camera of claim 5 wherein said low friction member comprises two plastic strips.

8. The camera of claim 3 wherein said low friction member is a plastic strip.

9. The camera of claim 3 wherein said low friction member is a metal strip.

10. The camera of claims 1 or 2 wherein said low friction member is a plastic strip.

11. The camera of claims 1 or 2 wherein said low friction member is a metal strip.

* * * * *